United States Patent
Hockey et al.

(10) Patent No.: US 10,244,004 B2
(45) Date of Patent: Mar. 26, 2019

(54) MANAGING INTERACTION CONSTRAINTS

(71) Applicant: Metaswitch Networks Ltd, Enfield (GB)

(72) Inventors: Alex Hockey, London (GB); Matthew Williams, London (GB); Robert Day, London (GB)

(73) Assignee: Metaswitch Networks Ltd, Enfield (GB)

( * ) Notice: Subject to any disclaimer, the term of this patent is extended or adjusted under 35 U.S.C. 154(b) by 102 days.

(21) Appl. No.: 15/274,932

(22) Filed: Sep. 23, 2016

(65) Prior Publication Data

US 2017/0093929 A1 Mar. 30, 2017

(30) Foreign Application Priority Data

Sep. 24, 2015 (GB) .................................. 1516919.6

(51) Int. Cl.
*H04L 29/06* (2006.01)
*H04L 29/08* (2006.01)

(52) U.S. Cl.
CPC ........ *H04L 65/1016* (2013.01); *H04L 65/105* (2013.01); *H04L 65/1006* (2013.01);
(Continued)

(58) Field of Classification Search
CPC ...................... H04L 65/1016; H04L 65/1006; H04L 65/105
(Continued)

(56) References Cited

U.S. PATENT DOCUMENTS 8,601,141 B2 * 12/2013 Veenstra ............. H04L 65/1016 709/202

8,812,700 B2  8/2014 Lu et al.
(Continued)

FOREIGN PATENT DOCUMENTS

| EP | 2299649 | 3/2011 |
|---|---|---|
| WO | 2008034817 | 3/2008 |

(Continued)

OTHER PUBLICATIONS

"CSCF Service Configuration Mode Commands"—Cisco, Aug. 2014 https://www.cisco.com/c/en/us/td/docs/wireless/asr_5000/20/CLI/books/C-D/20_C-D_CLI-Reference/20_C-D_CLI-Reference_chapter_0111010.pdf.*

(Continued)

*Primary Examiner* — Randy A Scott
(74) *Attorney, Agent, or Firm* — Wolf, Greenfield & Sacks, P.C.

(57) ABSTRACT

Embodiments of the present invention provide methods for providing a non-registering endpoint with non-registration services (such as the ability to make a call) in an IMS network without requiring the non-registering endpoint to register. A request for a non-registration service is received and processed by an entity in the IMS network that is configured to handle such requests. The entity requires information about the non-registering endpoint itself before it can process the request. Since the non-registering endpoint is part of the network, a Home Subscriber Server (HSS) knows some information about the non-registering endpoint, but can only provide this information to the entity if the non-registering endpoint is registered or being registered by the entity. Consequently, in embodiments, the entity makes it look like the non-registering endpoint is registering, in order for the entity to obtain the information from the HSS.

12 Claims, 4 Drawing Sheets

(52) U.S. Cl.
CPC ...... *H04L 65/1053* (2013.01); *H04L 65/1063* (2013.01); *H04L 65/1069* (2013.01); *H04L 65/1073* (2013.01); *H04L 67/2842* (2013.01)

(58) Field of Classification Search
USPC .......... 709/217, 227, 228, 231; 726/1, 7, 11; 379/35, 142.16, 142.17
See application file for complete search history.

(56) References Cited

U.S. PATENT DOCUMENTS

| | | | |
|---|---|---|---|
| 2010/0263032 A1* | 10/2010 | Bhuyan | H04L 63/061 726/7 |
| 2011/0158183 A1 | 6/2011 | Siegel et al. | |
| 2012/0219127 A1* | 8/2012 | Lu | H04L 12/66 379/88.17 |
| 2017/0374614 A1* | 12/2017 | Lemieux | H04W 52/0206 |

FOREIGN PATENT DOCUMENTS

| | | |
|---|---|---|
| WO | 2008084071 | 7/2008 |
| WO | 2010150043 | 12/2010 |
| WO | 2012177188 | 12/2012 |

OTHER PUBLICATIONS

United Kingdom Patent Application No. GB1516919.6, Search Report dated May 17, 2016.

\* cited by examiner

US 10,244,004 B2

MANAGING INTERACTION CONSTRAINTS

CROSS-REFERENCE TO RELATED APPLICATIONS

This application claims the benefit of United Kingdom Patent Application No. GB1516919.6, filed on Sep. 24, 2015 and entitled "Managing Interaction Constraints", which is hereby incorporated by reference herein.

FIELD OF THE INVENTION

The present invention generally relates to systems and methods for providing Internet Protocol (IP) Multimedia Subsystem (IMS) services, and in particular to methods for securely providing a non-registering endpoint with an IMS service in response to a non-registration request.

BACKGROUND TO THE INVENTION

In an IMS network, a user equipment (UE) typically comprises an Internet Protocol Private Branch Exchange (IP PBX) coupled to one or more terminals, such as an IP phone. The IP PBX is a type of endpoint in an IMS network which is used to connect terminals (e.g. IP phones) to the Public Switched Telephone Network via TCP/IP. The UE must register with the network before it can make and receive calls via the network. During this registration process, the UE is challenged to prove it belongs to the user whose identity it is registering as. If the UE cannot respond to the challenge correctly the registration fails and the UE is denied service by the IMS network.

IMS networks and entities within an IMS network use standard communication protocols to provide a UE with a service. In particular, IMS networks use the Session Initiation Protocol (SIP) for signalling and for controlling communication between entities in the network. SIP is commonly used for voice and video calls using IP-phones or over IP networks (such as IMS).

Typically, an IMS network has one or more SIP servers or proxies which are used to process SIP signalling packets in the network, and are collectively known as Call Session Control Function (CSCF) proxies or servers. A proxy CSCF (P-CSCF) is such a SIP server, and is usually the first point of contact for an IMS UE (i.e. an IP PBX coupled to one or more terminals). As part of the UE registration process, a P-CSCF will establish some sort of security association with the UE. Non-registration requests (such as call requests) are blocked at the P-CSCF unless they come in on such an association. Thus, the P-CSCF functions to, among other things, observe the authentication flows in the IMS network to determine if it can trust the UE and, if so, sets up the security association so that further SIP messages from the trusted UE are permitted.

A Serving CSCF (S-CSCF) server is another a SIP server and is generally used to perform session control between UEs for example. One function it performs is to issue the challenge to the UE, which it does by talking to a Home Subscriber Server (HSS), which comprises a master user database that supports the IMS entities which handle calls, and stores the entity's authentication credentials. Non-registration requests received by the S-CSCF via the P-CSCF are not challenged by the S-CSCF, since the P-CSCF has already verified that they should be trusted (and because the S-CSCF implicitly trusts the P-CSCF).

The security association can take several forms, which have different security characteristics. At the most secure level, the P-CSCF may establish an IPsec tunnel or TLS connection to the UE, which is difficult for a malicious third party to subvert. Alternatively, the P-CSCF may track the TCP connection to the UE as having been authenticated, and may permit subsequent requests on that connection. In a less secure alternative, the P-CSCF may track the IP address and port that the UE used for registration, and allow subsequent requests from that address and port, but this is quite easy for a malicious UE to forge.

As the security association may be quite weak, the IMS standard allows the S-CSCF to challenge non-registration requests at its own discretion, but only if the subscriber is currently registered and only if the subscriber uses a particular type of authentication (i.e. SIP digest authentication).

An Internet Protocol Private Branch Exchange (IP PBX) is a particular type of endpoint which is widely used by businesses and used to connect telephone extensions to the Public Switched Telephone Network via TCP/IP. An IP PBX uses SIP to talk to the 'core' of an IMS network, but an IP PBX often lacks the ability to register with the network. This means an IP PBX does not have a way of setting up a security association with the P-CSCF, and consequently, cannot make calls. Such an IP PBX is known as a non-registering PBX.

The present applicant has recognised the need for a system and method to handle non-registration requests (e.g. call requests) from non-registering PBXs.

SUMMARY

According to a first aspect of the present invention there is provided a method for providing a non-registering endpoint with services in an Internet Protocol (IP) Multimedia Subsystem (IMS) network, the method comprising: receiving, at a server in the IMS network configured to process requests, a non-registration request for an IMS service from the non-registering endpoint; requesting, by the server, of a Home Subscriber Server (HSS) a set of credentials for the non-registering endpoint; receiving, at the server, the set of credentials from the HSS; transmitting, using the server, an authentication challenge to the non-registering endpoint; receiving, at the server, a response to the authentication challenge from the non-registering endpoint; determining if the received response matches an expected response; authenticating, responsive to the determining, the non-registering endpoint if the received response matches the expected response; and routing, using the server, the received non-registration request in the IMS network to provide the authenticated non-registering endpoint with the requested IMS service.

According to a second aspect of the present invention there is provided a method for providing a non-registering endpoint with services in an Internet Protocol (IP) Multimedia Subsystem (IMS) network, the method comprising: receiving, at a proxy server, a non-registration request for an IMS service from the non-registering endpoint; forwarding, using the proxy server, the request to a Serving-Call Session Control Function (S-CSCF) server in the IMS network configured to process requests; simulating, by the S-CSCF server, registration of the non-registering endpoint at a Home Subscriber Server (HSS); receiving, responsive to the simulating, the set of credentials from the HSS at the S-CSCF server; transmitting, using the S-CSCF server, an authentication challenge to the non-registering endpoint; receiving, at the S-CSCF server, a response to the authentication challenge from the non-registering endpoint; determining if the received response matches an expected response; authenticating, responsive to the determining, the non-registering endpoint if the received response matches the expected response; and routing, using the S-CSCF server, the received non-registration request in the IMS network to provide the authenticated non-registering endpoint with the requested IMS service.

The following features apply equally to both aspects of the invention.

Typically, user equipment, such as a telephone, must register with an IMS network before it can make and received calls via the network. However, while user equipment can register, other devices such as Internet Protocol Private Branch Exchanges (IP PBXs), do not have the ability to register with the network. Consequently, they are denied registration-dependent services in the IMS network. Broadly speaking, embodiments of the present invention provide methods for providing a non-registering endpoint with non-registration services (such as the ability to make a call) in an IMS network without requiring the endpoints to register. A request for a non-registration service is received and processed by an entity in the IMS network that is configured to handle such requests. The entity requires information about the non-registering endpoint itself before it can process the request. Since the non-registering endpoint is part of the network, a Home Subscriber Server (HSS) knows some information about the non-registering endpoint, but can only provide this information to the entity if the non-registering endpoint is registered or being registered by the entity. Consequently, in embodiments, the entity makes it look like the non-registering endpoint is registering, in order for the entity to obtain the information from the HSS.

The term 'non-registering endpoint' is used interchangeably herein with "Internet Protocol Private Branch Exchange", "IP PBX", "PBX", "non-registering PBX", "non-registering IP-PBX", "non-registering device", "non-registering IMS terminal", and "non-registering entity".

The term "IMS network" is used interchangeably herein with "network", "Internet Protocol (IP) Multimedia Subsystem (IMS) network", and "IP network".

The term "service" is used interchangeably herein with "call", "IMS service", "non-registration IMS service", and "non-registration service".

The term "user equipment" or "UE" is used interchangeably herein to mean a non-registering endpoint coupled to at least one "endpoint", "device", "IMS terminal", "mobile phone", "computer", and "IP phone".

In embodiments, the requesting of the set of credentials is performed at substantially the same time as the transmitting of the authentication challenge to the non-registering endpoint.

In one arrangement, the server may be an S-CSCF server which is configured to challenge requests from a non-registering endpoint. In an alternative arrangement, an Application Server which is pre-associated with the non-registering endpoint. These arrangements are described in more detail below.

In embodiments, the transmitting of the authentication challenge comprises transmitting a 407 Proxy Authentication challenge to the non-registering endpoint. The 407 Proxy Authentication challenge technique may be used if the non-registering endpoint (e.g. an IP PBX) supports SIP Proxy Authentication. In additional or alternative embodiments, in particular where the IP PBX does not support SIP Proxy Authentication, the transmitting of the authentication challenge comprises transmitting a 401 WWW Authentication challenge. In such an embodiment, a server (such as a proxy server or P-CSCF) is configured to use the WWW-Authentication technique to send the authentication challenge, which may comprise changing the names of some SIP headers to ensure the correct challenge type is routed to the endpoint.

In embodiments, the step of receiving the request for a service from the non-registering endpoint comprises receiving the request via a proxy server (such as a P-CSCF server) configured to receive requests from endpoints in the IMS network.

As mentioned above, in one arrangement, the server may be a server which is configured to challenge requests from a non-registering endpoint. Accordingly, in a particular embodiment, the step of receiving the request for a service at the server, from the proxy server, comprises: determining, at the proxy server, whether the proxy server has configuration data associated with the non-registering endpoint, the configuration data comprising a public identity of the non-registering endpoint; forwarding, responsive to the determining, the request for the IMS service and the public identity to the HSS to determine a server to be used to process the request; and transmitting the request to the server.

In this embodiment, the step of transmitting the request to the server comprises forwarding the request to a Serving-Call Session Control Function (S-CSCF) server for processing the request.

The method may further comprise associating, at the HSS, the S-CSCF server with the non-registering endpoint, and providing the S-CSCF server with information needed to process all subsequent requests received from the associated non-registering endpoint. Advantageously, the association between the S-CSCF server and the non-registering endpoint means that if a subsequent request for a service is received from the non-registering endpoint, the HSS may be able to automatically specify that the S-CSCF server is to process the request. A further advantage is that the S-CSCF server already has the set of credentials for the non-registering endpoint, and so it can quickly check if the request originates from a trusted endpoint, etc. This may make the processing of subsequent requests more efficient and faster.

In embodiments, the requesting of the set of credentials comprises simulating, using the S-CSCF server, registration of the non-registering endpoint to enable the HSS to provide the set of credentials to the S-CSCF server.

Preferably, the simulating comprises sending a Multimedia-Auth-Request (MAR) to a Cx interface of the HSS, where the Cx interface of the HSS is configured to receive requests from the (S-CSCF) server. As will be described in more detail below, the HSS is configured to provide these credentials to an S-CSCF server during an IMS entity's registration process only, and thus, S-CSCF server cannot obtain these credentials outside of registration processing. Advantageously therefore, by sending the MAR, the S-CSCF server makes it seem to the HSS that the non-registering endpoint is attempting to register in the network, even though it is actually attempting to make a call (or other non-registration request).

In embodiments, associating the S-CSCF server with the authenticated non-registering endpoint comprises storing data in the HSS to associate the S-CSCF server which sent the MAR with the non-registering endpoint.

In embodiments, the transmitting of the request to the server comprises transmitting the request to a virtual S-CSCF server configured to process non-registration requests from non-registering endpoints.

In embodiments, the associating of the S-CSCF server with the non-registering endpoint comprises associating the virtual S-CSCF server with the non-registering endpoint.

In embodiments, the method comprises adding address data, using the proxy server, to the request for the service from the non-registering endpoint, the address data specifying that the request is to be processed by the virtual S-CSCF server; and transmitting, using the proxy server, the request for the service and the address data to the virtual S-CSCF server.

In embodiments, adding address data to the request for the service comprises adding a Uniform Resource Identifier (URI) identifying the virtual S-CSCF server.

In additional or alternative embodiments, the method comprises adding challenge data, using the proxy server, to the request for the service from the non-registering endpoint, the challenge data specifying that the request is to be challenged by the S-CSCF server; transmitting, using the proxy server, the request for the service and the challenge data to the S-CSCF server.

In embodiments, adding challenge data to the request for the service comprises adding a Session Initiation Protocol (SIP) parameter or header.

In embodiments, the method further comprises caching, at the server, the received set of credentials.

In embodiments, the method further comprises automatically receiving, at the S-CSCF server, updated credentials from the Cx interface of the HSS for the non-registering endpoint, and caching the updated credentials.

As mentioned above, in one arrangement, the server may be a server which is pre-associated with the non-registering endpoint. Accordingly, in a particular embodiment, the step of receiving the request for a service at the server, from the proxy server, comprises: determining, at the proxy server, whether the proxy server has configuration data associated with the non-registering endpoint, the configuration data comprising a public identity of the non-registering endpoint; forwarding, responsive to the determining, the request for the IMS service and the public identity to a Serving-Call Session Control Function (S-CSCF) server; transmitting a Server Assignment Request (SAR), by the S-CSCF server to the HSS, to obtain subscription data specifying: a subscription of the non-registering endpoint to an Application Server (AS), and a static association of the Application Server with the non-registering endpoint; and receiving the subscription data and, responsive to the receiving, forwarding the received request for a service to the associated Application Server.

Preferably, the requesting of the set of credentials comprises sending, by the Application Server, a Multimedia-Auth-Request (MAR) to a Zh interface of the HSS. An Application Server does not usually have access to an endpoint's authentication credentials when it is processing a SIP request from the endpoint. To obtain the credentials, the Application Server preferably uses the Zh interface of the HSS to make a web-based request for the credentials. Generally, web requests can be made by the Application Server at any time, regardless of whether an endpoint or UE (such as an IP PBX coupled to one or more terminals) is registered in the network or currently in a call. As such, Zh MARs can be sent at any time. However, an Application Server would not send a Zh MAR for a call, because the UE would already be authenticated. Accordingly, by making it seem like, to the HSS, that a UE/endpoint is making a web-request, the AS is permitted to send the Zh MAR request to the HSS, and the HSS is in turn, able to (permitted to) supply the requested credentials.

In embodiments, the method further comprises caching, at the Application Server, the received set of credentials.

In embodiments, the method comprises requesting, at the Application Server, updated credentials from the Zh interface of the HSS for the non-registering endpoint, and caching the updated credentials.

In embodiments, the method comprises requesting updated credentials comprises querying the HSS when a new request for an IMS service is received from the non-registering endpoint.

In embodiments, the requesting of the set of credentials comprises simulating, using the Application Server, access of an endpoint to a web-based service, to enable the HSS to provide the set of credentials of the non-registering endpoint.

In a related aspect of the invention, there is provided a Home Subscriber Server (HSS) in an Internet Protocol (IP) Multimedia Subsystem (IMS) network, the HSS comprising: a data store for storing credentials for at least one non-registering endpoint in the IMS network; a communication module for interfacing with a plurality of servers in the IMS network; and a processor coupled to the data store and the communication module, and configured to: receive, from a first server, a request for an IMS service from a non-registering endpoint; and transmit data, to the first server, specifying a second server to be used to process the request from the non-registering endpoint; receive a Multimedia-Auth-Request (MAR) from a second server in relation to the non-registering endpoint; and transmit, responsive to the MAR, a set of credentials for the non-registering endpoint to the second server.

In embodiments, the processor is further configured to: store data in the data store to associate the second server which sent the MAR with the non-registering endpoint.

In embodiments, the communication module of the HSS comprises a Cx interface for interfacing with the second server; and is configured to automatically transmit updated credentials to the associated second server.

In embodiments, responsive to the received request for an IMS service, the HSS processor is further configured to: retrieve subscription data from the data store, the subscription data specifying a subscription of the non-registering endpoint to an Application Server, and specifying a static association of the Application Server with the non-registering endpoint; and transmit data to the first server specifying that the associated Application Server is to be used to process the request from the non-registering endpoint.

In embodiments, the communication module of the HSS comprises a Zh interface for interfacing with the Application Server, and is configured to: receive a request for updated credentials from the Application Server; and transmit, responsive to the received request, updated credentials to the Application Server.

In a further aspect of the invention, there is provided a Serving-Call Session Control Function (S-CSCF) server in an Internet Protocol (IP) Multimedia Subsystem (IMS) network, the S-CSCF comprising: a communication module for interfacing with a Home Subscriber Server (HSS); and a processor coupled to the communication module, and configured to: receive a non-registration request for an IMS service from a non-registering endpoint; request of the HSS a set of credentials for the non-registering endpoint; receive the set of credentials from the HSS; transmit an authentication challenge to the non-registering endpoint; receive a response to the authentication challenge from the non-registering endpoint; determine if the received response matches an expected response; authenticate, responsive to the determining, the non-registering endpoint if the received response matches the expected response; and route the received non-registration request in the IMS network to provide the authenticated non-registering endpoint with the requested IMS service.

In embodiments, the processor of the S-CSCF server is further configured to simulate registration of the non-registering endpoint to enable the HSS to provide the set of credentials.

In embodiments, the S-CSCF server comprises a data store to cache the received set of credentials for the non-registering endpoint.

In embodiments, the processor of the S-CSCF server is configured to send a Multimedia-Auth-Request (MAR) to a Cx interface of the HSS to obtain the set of credentials.

In embodiments, the S-CSCF server comprises a logical partition into a first virtual server configured to process non-registration requests from non-registering endpoints, and a second virtual server configured to process requests from registering endpoints.

In embodiments, the S-CSCF server processor is configured to receive the request for an IMS service from the non-registering endpoint and address data specifying that the request is to be processed by the first virtual server.

In a further aspect of the invention, there is provided an Application Server (AS) in an Internet Protocol (IP) Multimedia Subsystem (IMS) network, the Application Server comprising: a communication module for communicating with a Zh interface of a Home Subscriber Server (HSS); and a processor coupled to the communication module, and configured to: receive a non-registration request for an IMS service from a non-registering endpoint; request of the HSS a set of credentials for the non-registering endpoint; receive the set of credentials from the HSS; transmit an authentication challenge to the non-registering endpoint; receive a response to the authentication challenge from the non-registering endpoint; determine if the received response matches an expected response; authenticate, responsive to the determining, the non-registering endpoint if the received response matches the expected response; and route the received non-registration request in the IMS network to provide the authenticated non-registering endpoint with the requested IMS service.

In embodiments, the AS server processor is further configured to simulate access of an endpoint to a web-based service to enable the HSS to provide the set of credentials.

In embodiments, the AS server processor is configured to send a Multimedia-Auth-Request (MAR) to the Zh interface of the HSS to obtain the set of credentials.

The above features apply equally to the following aspects of the invention.

In a further aspect of the invention, there is provided a system for providing a non-registering endpoint with a service from an Internet Protocol (IP) Multimedia Subsystem (IMS) network, the system comprising: a Home Subscriber Server (HSS) in an Internet Protocol (IP) Multimedia Subsystem (IMS) network, as described above and herein; and a server configured to: receive a non-registration request for an IMS service from the non-registering endpoint; request of the HSS a set of credentials for the non-registering endpoint; receive the set of credentials from the HSS; transmit an authentication challenge to the non-registering endpoint; receive a response to the authentication challenge from the non-registering endpoint; determine if the received response matches an expected response, authenticate, responsive to the determining, the non-registering endpoint if the received response matches the expected response; and route the received non-registration request in the IMS network to provide the authenticated non-registering endpoint with the requested IMS service.

In a further aspect of the invention, there is provided a logical arrangement for providing a non-registering endpoint with services in an Internet Protocol (IP) Multimedia Subsystem (IMS) network, the logical arrangement comprising logic circuitry adapted to perform the steps of: receiving, at a server, a non-registration request for an IMS service from the non-registering endpoint; requesting, by the server, of a Home Subscriber Server (HSS) a set of credentials for the non-registering endpoint; receiving, at the server, the set of credentials from the HSS; transmitting, using the server, an authentication challenge to the non-registering endpoint; receiving, at the server, a response to the authentication challenge from the non-registering endpoint; determining if the received response matches an expected response, authenticating, responsive to the determining, the non-registering endpoint if the received response matches the expected response; and routing the received non-registration request in the IMS network to provide the authenticated non-registering endpoint with the requested IMS service.

It will also be clear to one of skill in the art that all or part of a logical method according to the preferred embodiments of the present techniques may suitably be embodied in a logic apparatus comprising logic elements to perform the steps of the above-described methods, and that such logic elements may comprise components such as logic gates in, for example a programmable logic array or application-specific integrated circuit. Such a logic arrangement may further be embodied in enabling elements for temporarily or permanently establishing logic structures in such an array or circuit using, for example, a virtual hardware descriptor language, which may be stored and transmitted using fixed or transmittable carrier media.

In a related aspect of the invention, there is provided a non-transitory data carrier carrying code which, when implemented on a processor, causes the processor to carry out the methods described above and herein.

In a related aspect of the invention, there is provided processor control code to implement the above-described systems and methods, for example on a general purpose computer system or on a digital signal processor (DSP). The techniques also provides a carrier carrying processor control code to, when running, implement any of the above methods, in particular on a non-transitory data carrier—such as a disk, microprocessor, CD- or DVD-ROM, programmed memory such as read-only memory (firmware), or on a data carrier such as an optical or electrical signal carrier. The code may be provided on a carrier such as a disk, a microprocessor, CD- or DVD-ROM, programmed memory such as non-volatile memory (e.g. Flash) or read-only memory (firmware). Code (and/or data) to implement embodiments of the techniques may comprise source, object or executable code in a conventional programming language (interpreted or compiled) such as C, or assembly code, code for setting up or controlling an ASIC (Application Specific Integrated Circuit) or FPGA (Field Programmable Gate Array), or code for a hardware description language such as Verilog™ or VHDL (Very high speed integrated circuit Hardware Description Language). As the skilled person will appreciate, such code and/or data may be distributed between a plurality of coupled components in communication with one another. The techniques may comprise a controller which includes a microprocessor, working memory and program memory coupled to one or more of the components of the system.

Computer program code for carrying out operations for the above-described techniques may be written in any combination of one or more programming languages, including object oriented programming languages and conventional procedural programming languages. Code components may be embodied as procedures, methods or the like, and may comprise sub-components which may take the form of instructions or sequences of instructions at any of the levels of abstraction, from the direct machine instructions of a native instruction set to high-level compiled or interpreted language constructs.

Embodiments of the present invention may be realised in the form of a computer implemented method of deploying a service comprising steps of deploying computer program code operable to, when deployed into a computer infrastructure or network and executed thereon, cause said computer system or network to perform all the steps of the above-described method. For example, the steps may be deployed entirely in a private network, entirely in a public network, in any combination of public and private networks (which may be cloud networks). In embodiments, the steps may be deployed across multiple public and/or private cloud networks.

The methods described herein may be performed by one or more processing components distributed over a dispersed and flexible network, such as a grid computing environment, a private cloud computing environment, a public cloud computing environment or the like. A combination of environments, such as a hybrid public-private cloud, may also be envisaged as a suitable environment in which to embody the present technology. The processing components in such environments are by nature heterogeneous, and thus the method may be performed using combinations of code elements suitable to the varied environments involved.

In a further alternative, a preferred embodiment of the present techniques may be realized in the form of a data carrier having functional data thereon, said functional data comprising functional computer data structures to, when loaded into a computer system or network and operated upon thereby, enable said computer system to perform all the steps of the above-described method.

BRIEF DESCRIPTION OF THE DRAWINGS

The techniques are diagrammatically illustrated, by way of example, in the accompanying drawings, in which.

DETAILED DESCRIPTION

Figure 1:
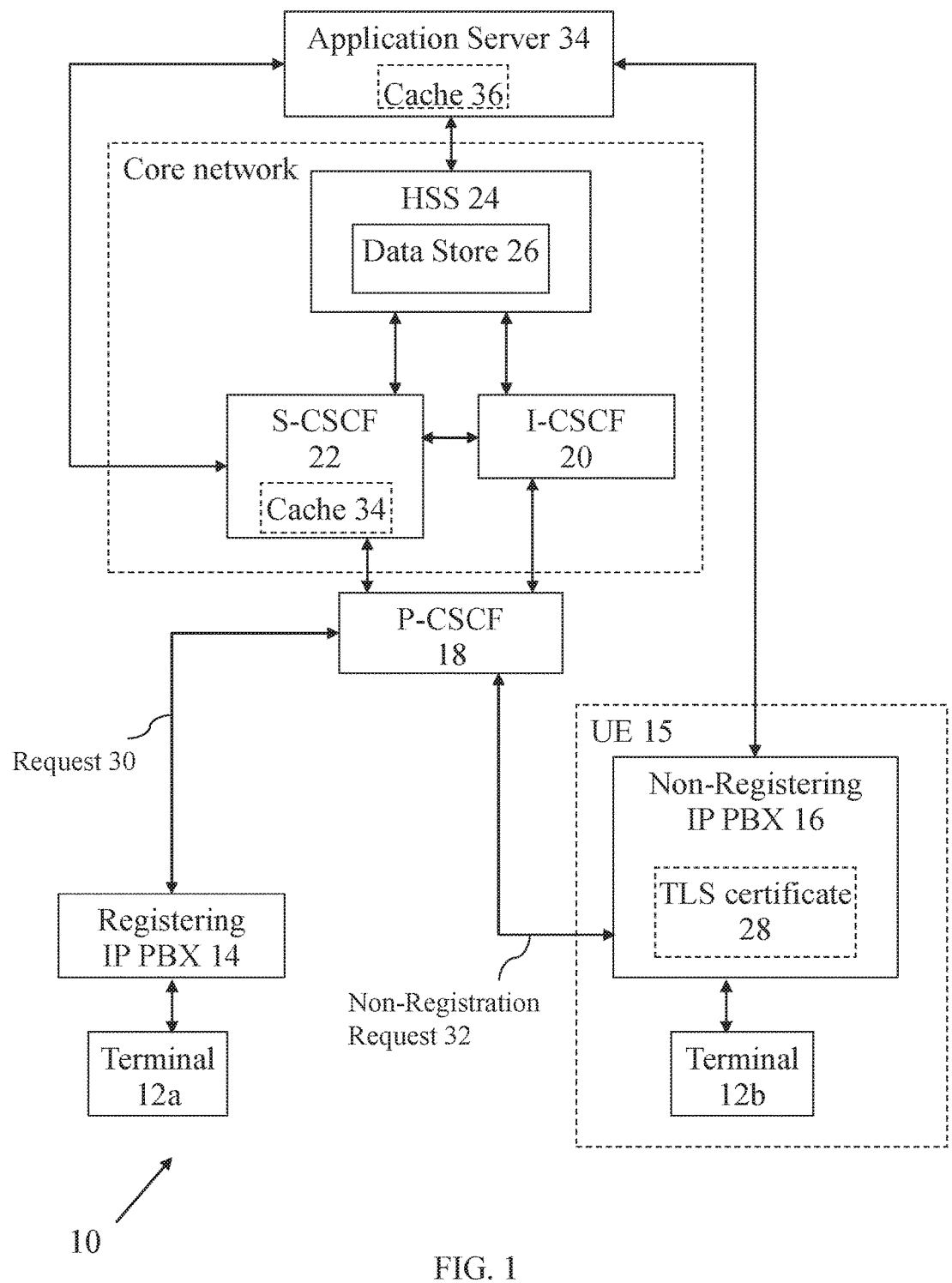
FIG. 1 shows a schematic diagram of an Internet Protocol (IP) Multimedia Subsystem (IMS) network configured to provide a non-registering endpoint with services.

Broadly speaking, embodiments of the present invention provides methods for providing a non-registering endpoint with non-registration services (such as the ability to make a call) in an IMS network without requiring the non-registering endpoint to register. A request for a non-registration service is received and processed by an entity in the IMS network that is configured to handle such requests. The entity requires information about the non-registering endpoint itself before it can process the request. Since the non-registering endpoint is part of the network, a Home Subscriber Server (HSS) knows some information about the non-registering endpoint, but can only provide this information to the entity if the non-registering endpoint is registered or being registered by the entity. Consequently, in embodiments, the entity makes it look like the non-registering endpoint is registering, in order for the entity to obtain the information from the HSS.

The embodiments illustrated in FIGS. 1 to 4 provide solutions to the problem of providing non-registering endpoints with IMS services which cannot register themselves in the network. Throughout the following description, like reference numerals are used to describe like parts and process steps.

FIG. 1 shows a schematic diagram of an Internet Protocol (IP) Multimedia Subsystem (IMS) network 10 configured to provide a non-registering endpoint with IMS services. The network 10 typically comprises a plurality of terminals 12 which subscribe to services provided by the IMS network. A terminal 12 is for example, a telephone, computer or IP phone. A device is provided between each terminal and the other entities of the network 10. An example device is an IP PBX, which functions to connect the terminal(s) to other entities in the network (e.g. other terminals) to provide the terminal with services such as telephone calls, audio, video or instant messaging communication, etc. Generally speaking, an IMS-compliant system may consider an IP PBX and all terminals connected to it to be a single piece of user equipment (UE) 15, as shown in FIG. 1.

In FIG. 1, a terminal 12a is coupled to a registering IP-PBX 14, which has registered itself with the network 10. In particular, the registering IP PBX 14 has established a security association with P-CSCF 18 which means that a request 30 sent by the IP PBX on such an association will be implicitly trusted by the P-CSCF 18. A further terminal 12b is coupled to a non-registering IP PBX 16 which has not, and may not be able to, register with the network 10 and set up an association with the P-CSCF 18. (As shown, the combination of the terminal 12b and the non-registering IP PBX 16 may be termed a user equipment or UE 15). A non-registration request 32 made by the non-registering IP PBX 16 will not be trusted by the P-CSCF 18 and will not be automatically processed. This is a problem, since IP PBXs are widely used by businesses, and thus it is important to allow such IP PBXs to make calls while preventing malicious third parties from pretending to be the IP PBX and obtaining unauthorised access to IMS services.

A prior art technique to get around this problem is to use Transport Layer Security (TLS) certificates, to securely communicate over the network 10. A non-registering IP PBX 16 which supports the use of TLS certificates 28 can use the certificate to prove its identity to the P-CSCF. This avoids the need for it to register in the network. Unfortunately, most IP PBXs do not support this technique. The IMS standard allows an S-CSCF to challenge non-registration requests made by registered endpoints, but as a consequence, it does not allow an S-CSCF to challenge non-registration requests made by non-registering IP PBXs. Accordingly, if a malicious third party were to somehow trick the P-CSCF to permit its non-registration request, an S-CSCF which encountered the request would not be able to challenge the third party.

A solution provided by embodiments of the present invention is to enable an S-CSCF to challenge calls or other non-registration requests received from a non-registering endpoint. When a non-registering IP PBX 16 sends a non-registration request to the network 10, it is received by the proxy SIP server, P-CSCF 18. The P-CSCF uses a technique such as IP address matching to identify that the request originated from non-registering IP PBX 16.

Each IMS user, such as IP PBX 14 and non-registering IP PBX 16, comprises an IP multimedia private identity (IMPI) and an IP multimedia public identity (IMPU). The IMPI is a unique, permanently allocated global identity by the network operator to the non-registering IP PBX 16 (as well as to any other IMS entities). The IMPU is used by any user for requesting communications, and there may be multiple IMPU per IMPI. IMS users register with the network using their public identities, but authenticate themselves using their private identities. The P-CSCF 18 determines, using IP address matching or otherwise, what the public identity (IMPU) of the non-registering IP PBX 16 is, and adds this to the non-registration request 32 before forwarding the request to be processed.

Typically, the non-registration request 32 is sent from the P-CSCF 18 to an interrogating CSCF (I-CSCF) 20, which is configured to forward SIP packets to other entities in the network. However, in embodiments, the P-CSCF 18 may forward the non-registration request 32 to S-CSCF 22. In other embodiments, there may only be a single SIP server in the network 10, which is configured to receive the non-registration request, perform the authentication process (described below) and process the request.

The non-registration request 32 is eventually received by Home Subscriber Server (HSS) 24, which is queried to determine which server in the network 10 should process the request 32. There are two main options, which use different mechanisms and which use different network elements. The first option uses S-CSCF capabilities to select an S-CSCF. These are acted on by an I-CSCF. In other words, in the first option, the HSS 24 could specify that an S-CSCF 22 that is configured to challenge requests received from non-registering endpoints is to process the request. The second option uses initial filter criteria (iFCs) to identify an Application Server. These are acted on by an S-CSCF. In other words, in the second option, the HSS 24 could specify that an Application Server 34 is to be used to process the request.

In the first technique, the HSS 24 is configured such that it specifies that only S-CSCFs 22 that can challenge requests from non-registering endpoints are to be used to process the request 32. The P-CSCF 18 then routes the request 32 to the I-CSCF 20. The P-CSCF 18 routes the request 32 to the I-CSCF 20 because the address of the I-CSCF 20 may be configured globally on the P-CSCF, or may be configured in configuration data which is associated with the non-registering endpoint and which is stored in the P-CSCF 18. Additionally or alternatively, the address of the I-CSCF 20 could be derived from the IMPU of the non-registering endpoint. selects an appropriate S-CSCF 22 to forward the request 32 to for processing. (There may only be a single S-CSCF 22 in the network 10, in which case, if it supports challenging requests, the request 32 will be forwarded to this server. If the single S-CSCF 22 does not support challenging requests, the request 32 is not forwarded and the process terminates without supplying the IP PBX 16 with the requested service). In an additional or alternative arrangement, the P-CSCF 18 may be configured to route non-registration requests 32 from the non-registering IP PBX 16 directly to an S-CSCF 22 that supports challenging requests from non-registered users.

In this first technique, the S-CSCF 22 needs to determine if the non-registering endpoint 16 which submitted the request 32 is authorised to use the services provided by IMS network 10. Generally, an endpoint which is connected to the network 10 and has subscribed to IMS services is known to the HSS 24. Therefore, to determine if the non-registering endpoint 16 is authorised to (i.e. has subscribed to) access the IMS services, the S-CSCF 22 requires credentials associated with the non-registering IP PBX 16, which are stored in the HSS 24 (or in a data store 26 in, or coupled to, the HSS 24). The S-CSCF 22 requests the credentials from the HSS via the Cx interface of the HSS. The HSS 24 is configured to provide these credentials via the Cx interface during an IMS entity's registration process only, and thus, S-CSCF 22 cannot get these credentials outside of registration processing. Since the non-registering IP PBX 16 is unable to register, the S-CSCF 22 makes it seem, to the HSS 24, that the non-registering IP PBX 16 is attempting to register in the network, even though it is actually attempting to make a call (or other non-registration request). Since the HSS 24 believes that the non-registering IP PBX 16 is registering, the HSS 24 provides the S-CSCF 22 with the requested stored credentials of the IP PBX 16.

In parallel (e.g. at substantially the same time), the S-CSCF 22 which receives the request 32 uses SIP proxy authentication to authenticate the request 32. The S-CSCF 22 is configured to send an authentication challenge to the non-registering IP PBX 16. The challenge may be routed to the non-registering IP PBX 16 via the I-CSCF 20 and/or the P-CSCF 18. In embodiments, the authentication challenge is a 407 Proxy Authentication challenge (if the non-registering endpoint (e.g. an IP PBX) supports SIP Proxy Authentication). In additional or alternative embodiments, in particular where the IP PBX does not support SIP Proxy Authentication, the transmitting of the authentication challenge comprises transmitting a 401 WWW Authentication challenge. In such an embodiment, a server (such as a proxy server or P-CSCF) is configured to use the WWW-Authentication technique to send the authentication challenge, which may comprise changing the names of some SIP headers to ensure the correct challenge type is routed to the endpoint. The non-registering endpoint 16 is configured to calculate and transmit a response to the authentication challenge, which eventually finds its way to the S-CSCF 22. The S-CSCF 22 is configured to determine if the received response matches the expected response to the challenge, and if there is a match, the S-CSCF 22 authenticates the non-registering IP PBX 16. The S-CSCF 22 then processes the request 32 in the usual way, and may route the request 32 to other entities in the network. The credentials obtained by the S-CSCF 22 for the non-registering IP PBX 16 may be stored by the S-CSCF 22 in a cache 34 that is part of, or coupled to, the S-CSCF 22. This means the S-CSCF 22 does not need to request the credentials from the HSS 24 the next time it receives a non-registration request from the non-registering IP PBX 16. This first technique is described in more detail below with reference to FIG. 3.

In the second technique, the HSS 24 specifies that an Application Server 34 is to be used to process the request 32. Here, the HSS 24 stores not only subscription information specifying if a non-registering endpoint 16 has subscribed to IMS services, but also stores information specifying an Application Server 34 that is to be used to process any requests obtained from the non-registering endpoint 16. The Application Server 34 is pre-associated with the non-registering endpoint 16. Application servers generally do not normally have access to an entity's subscription/authentication credentials when processing a SIP request. To obtain the credentials, the Application Server 34 sends a request to the HSS 24 for the credentials. The Application Server 34 does not usually have access to an endpoint's authentication credentials when it is processing a SIP request from the endpoint. To obtain the credentials, the Application Server 34 uses the Zh interface of the HSS to make a web-based request for the credentials. Generally, web requests can be made by the Application Server 34 at any time, regardless of whether an endpoint or UE (such as an IP PBX coupled to one or more terminals) is registered in the network or currently in a call. As such, Zh MARs can be sent at any time. However, an Application Server 34 would not send a Zh MAR for a call, because the UE would already be authenticated. Accordingly, by making it seem like, to the HSS 24, that the non-registering endpoint 16 is making a web-request, the Application Server 34 is permitted to send a Zh MAR request to the HSS 24, and the HSS 24 is in turn, permitted to supply the requested credentials.

As in the first technique, the Application Server 34 is configured to send an authentication challenge to the non-registering IP PBX 16. In embodiments, the authentication challenge is a 407 Proxy Authentication challenge or a 401 WWW Authentication challenge (depending on whether the server supports SIP Proxy Authentication, as explained earlier). The authentication process is similar to that described above for the first technique. Similarly, the credentials obtained by the Application Server 34 for the non-registering IP PBX 16 may be stored by the Application Server 34 in a cache 36 that is part of, or coupled to, the Application Server 34. This means the Application Server 34 does not need to request the credentials from the HSS 24 the next time it receives a non-registration request from the non-registering IP PBX 16.

In both techniques, once a non-registering IP PBX 16 has been successfully used to obtain an IMS service (e.g. to make a call), the S-CSCF 22 or the Application Server 34 are configured to automatically receive subsequent non-registration requests 32 from the same non-registering IP PBX 16.

Figure 2:
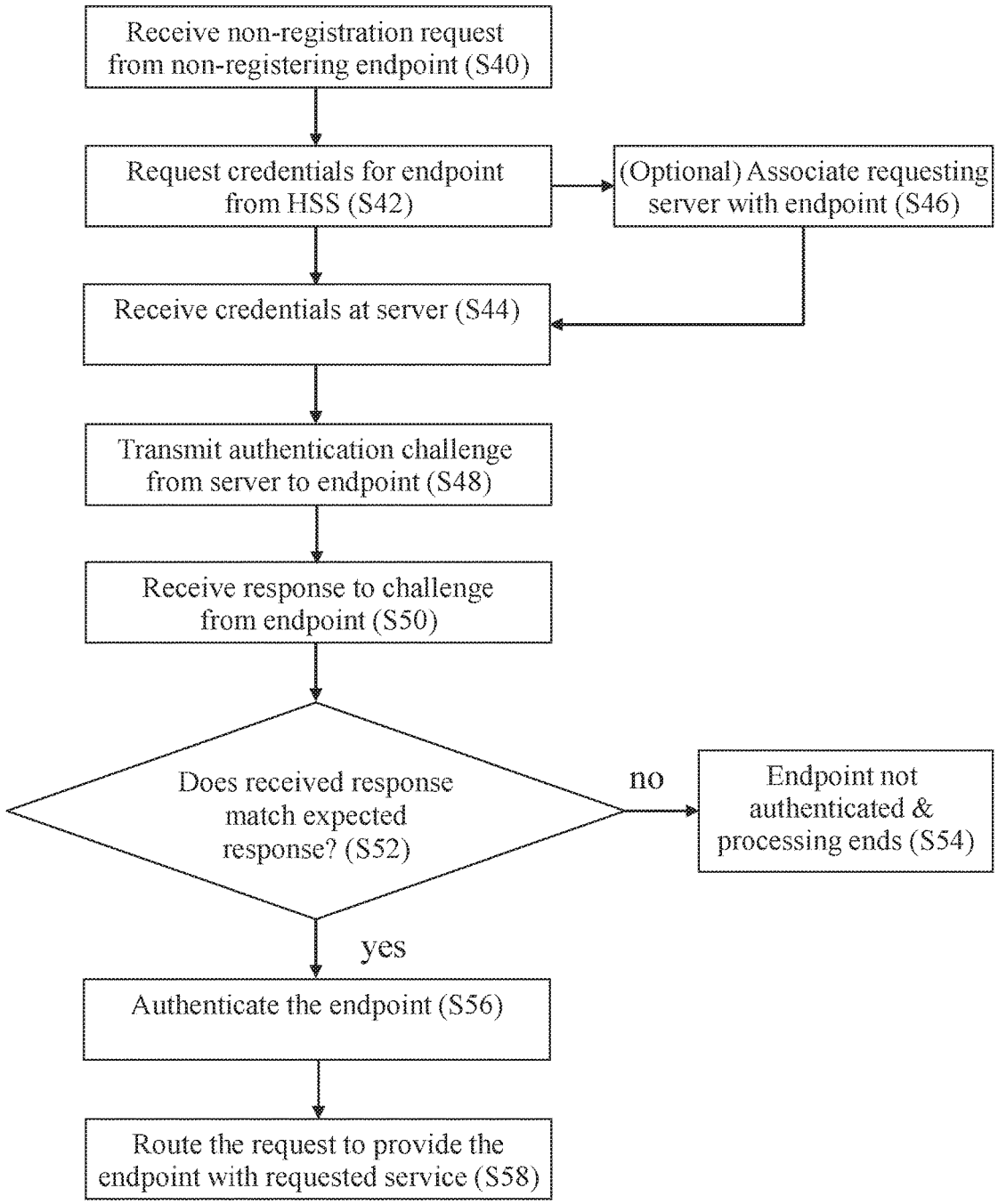
FIG. 2 shows a flowchart of the steps to provide a non-registering endpoint with services in an IMS network.

Turning now to FIG. 2, this shows a flowchart of the steps to provide a non-registering endpoint with services in an IMS network. A non-registration request for an IMS service is received from a non-registering endpoint, at a server in the IMS network configured to process such requests (step S40). As explained above, the server may be an S-CSCF server 22 which is configured to challenge requests, or an Application Server 34 which is pre-associated with the non-registering endpoint. The server requests, of a Home Subscriber Server (HSS), a set of credentials for the non-registering endpoint (step S42) to determine if the non-registering endpoint is permitted to access IMS services. This is typically performed by sending a Multimedia Authentication Request (MAR) to the HSS. In the case where the S-CSCF server sends the MAR to the HSS, the HSS is configured to associate the server with the non-registering endpoint for which credentials are requested (step S46). However, in the case where the Application Server 34 sends the MAR to the HSS, the association step is not required, as the association already exists.

The HSS supplies the requested credentials to the server (step S44). The server is configured to challenge the authenticity of the non-registering endpoint. This may occur after the credentials are received from the HSS, or at substantially the same time (as the credentials are not necessarily used in the authentication process). The server determines and transmits an authentication challenge to the non-registering endpoint (step S48). As explained above, the challenge may be sent directly to the non-registering endpoint (if a communication path between the server and endpoint exists), or via other entities in the network (e.g. P-CSCF, I-CSCF, etc.). The non-registering endpoint calculates a response to the authentication challenge and sends the response back to the server (via other entities in the network which route the response to the appropriate server). The server therefore receives the response to the authentication challenge from the non-registering endpoint (step S50) and determines if the received response matches an expected response (step S52).

If the received response does not match the expected response, the non-registering endpoint has failed the authentication challenge and the server stops processing the received request (step S54). A message may be transmitted to the non-registering endpoint to indicate that the authentication failed. If the received response does match the expected response, the server authenticates the non-registering endpoint (step S56). The authentication comprises storing/caching the credentials the server received from the HSS in step S44. In embodiments, the server is an S-CSCF as explained earlier, and the S-CSCF caches the credentials as well as the initial filter criteria (iFCs) it has obtained from the HSS. In other embodiments, the server is an Application Server, and the Application Server caches the credentials it has obtained from the HSS. (In this case, the iFCs are obtained by an S-CSCF, as explained in more detail with respect to FIG. 4). The server is then able to process the received request and route the received non-registration request in the IMS network to provide the authenticated non-registering endpoint with the requested IMS service (step S58).

Figure 3:
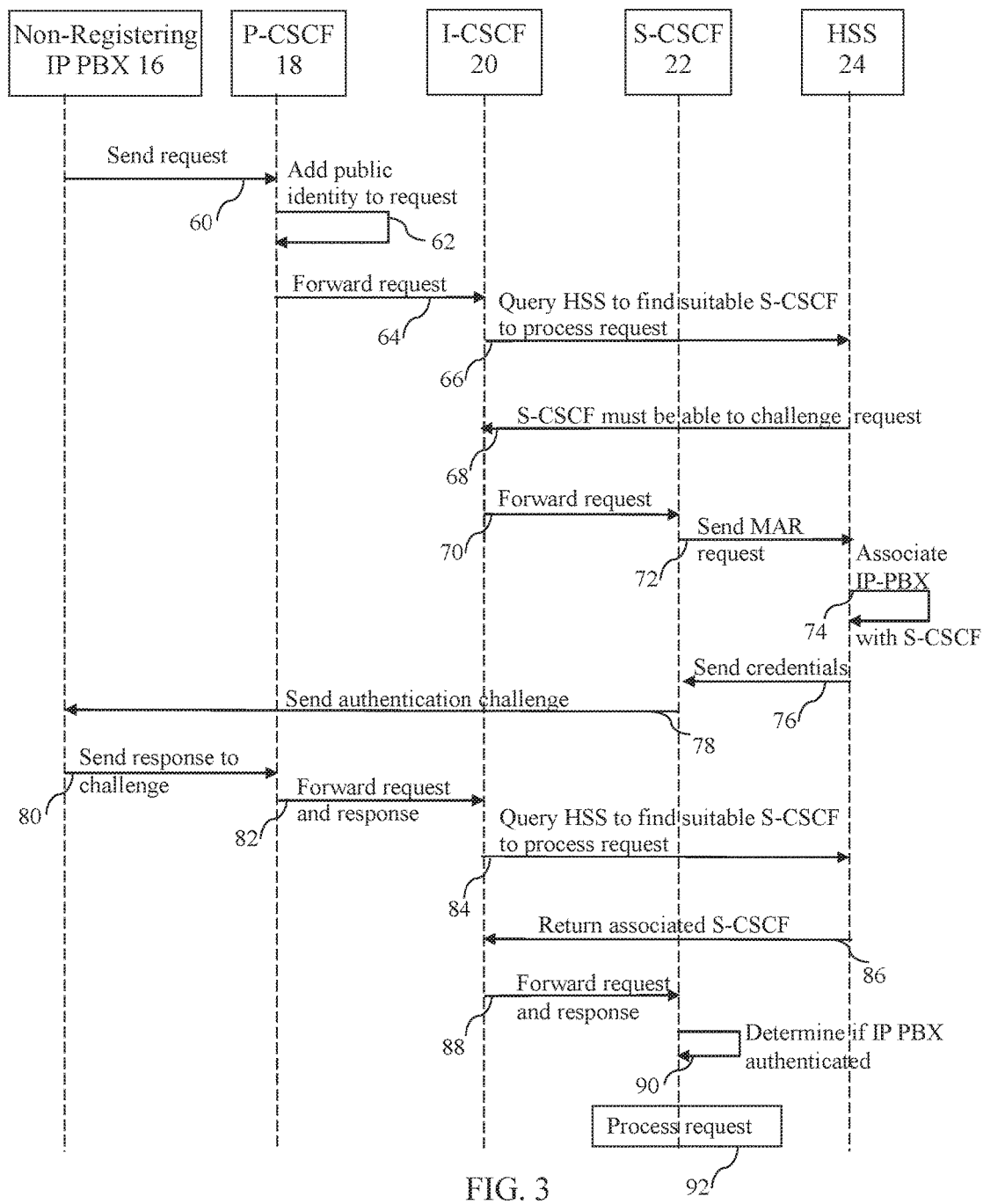
FIG. 3 shows a schematic diagram of the steps to provide a non-registering endpoint with services in an IMS network using an S-CSCF server.
Figure 4:
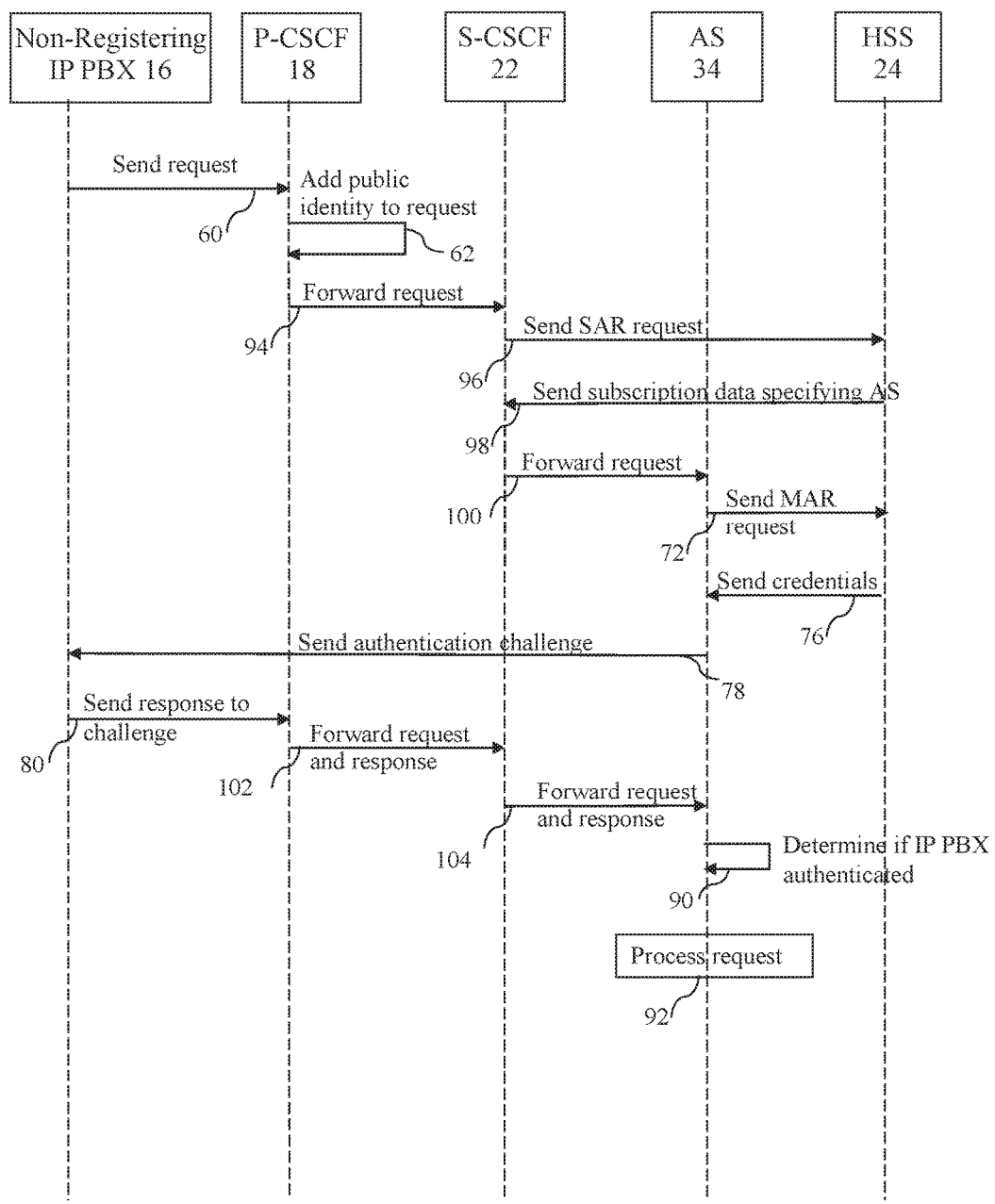
FIG. 4 shows a schematic diagram of the steps to provide a non-registering endpoint with services in an IMS network using an Application Server.

Turning now to FIGS. 3 and 4, these illustrate the two above-mentioned embodiments in which either an S-CSCF server or an Application Server is used to process a non-registration request received from a non-registering endpoint.

FIG. 3 shows a schematic diagram of the steps to provide a non-registering endpoint with services in an IMS network using an S-CSCF server. A non-registering IP PBX 16 transmits a non-registration request (step 60) to the IMS network. In this example process flow, the request is initially received by a proxy server, P-CSCF 18. The P-CSCF 18 is configured to determine if the request has been received from a known entity. As mentioned earlier, each IMS user, such as non-registering IP PBX 16, comprises an IP multimedia private identity (IMPI) and an IP multimedia public identity (IMPU). The IMPI is a unique, permanently allocated global identity by the network operator to the non-registering IP PBX 16 (as well as to any other IMS entities). A UE in an IMS network is provided with a set of IMPUs that it is permitted to use, and the terminal would not use any other IMPUs. Thus, a terminal uses one of the set of IMPUs to request communications, and there may be multiple IMPU per IMPI. IMS users register with the network using their public identities, but authenticate themselves using their private identities. The P-CSCF 18 determines if it has configuration data associated with the non-registering endpoint 16, the configuration data comprising a public identity (IMPU) of the non-registering endpoint 16. Even if the P-CSCF 18 knows what the public identify of the non-registering endpoint 16 is, the P-CSCF 18 does not automatically trust the non-registering endpoint 16. Instead, the P-CSCF 18 now knows that the request can be allowed into the core network, but must be challenged. On the other hand, if the P-CSCF 18 does not have configuration data comprising a public identity of the non-registering endpoint 16, the P-CSCF 18 knows to not trust the endpoint 16 and rejects the received request.

If the public identity IMPU is known to the P-CSCF 18, the public identity is added to the non-registration request before forwarding the request (step 62). This may be added to the request in the P-Asserted-Identity (PAI) portion/header of the SIP request. The P-CSCF 18 then forwards the modified request to an I-CSCF 20 (step 64). The I-CSCF 20 queries the HSS 24 to find a suitable server (S-CSCF server) to process the request (step 66). The HSS 24 uses the public identity added to the request to determine whether or not the non-registering endpoint 16 needs to be processed in a particular way. In this case, the HSS 24 determines that the non-registering endpoint 16 must be processed or served by an S-CSCF server which can challenge the request. Accordingly, the HSS 24 transmits a response to the I-CSCF 20 specifying that an S-CSCF server that can challenge the request is required (step 68).

The I-CSCF 20 determines a suitable S-CSCF server that is configured to challenge requests and forwards the request to the S-CSCF server (step 70). As mentioned above, in some cases, there may only be one suitable S-CSCF server, but in cases where there are multiple suitable S-CSCF servers, the I-CSCF 20 selects a particular S-CSCF server.

The S-CSCF server 22 requests, of a Home Subscriber Server (HSS), a set of credentials for the non-registering endpoint 16 (step 72) to determine if the non-registering endpoint is permitted to access IMS services. This is typically performed by sending a Multimedia Authentication Request (MAR) to the HSS. Typically, the MAR is sent by the S-CSCF server 22 to the Cx interface of the HSS 24, which is configured to receive requests from the S-CSCF server. As mentioned earlier, the HSS 24 is configured to provide these credentials during an IMS entity's registration process only, and thus, S-CSCF 22 cannot get these credentials outside of registration processing. Since the non-registering IP PBX 16 is unable to register, the S-CSCF 22 makes it seem, to the HSS 24, that the non-registering IP PBX 16 is attempting to register in the network, even though it is actually attempting to make a call (or other non-registration request). Since the HSS 24 believes that the non-registering IP PBX 16 is registering, the HSS 24 provides the S-CSCF 22 with the requested stored credentials of the IP PBX 16.

The HSS is configured to associate the S-CSCF server 22 which sent the MAR with the non-registering endpoint 16 (step 74). This association means that if a subsequent request for a service is received from the non-registering endpoint, the HSS 24 will be able to automatically specify the S-CSCF server 22 when it is queried by the I-CSCF 20. A further advantage is that the S-CSCF server already has the set of credentials for the non-registering endpoint (from when it performed the MAR) and so it can quickly check if the request originates from a trusted endpoint, etc. This may make the processing of subsequent requests more efficient and faster.

The HSS 24 then supplies the requested credentials to the S-CSCF server (step 76). The S-CSCF server 22 is configured to authenticate the non-registering endpoint 16. This may occur after the credentials are received from the HSS, or at substantially the same time (as the credentials are not necessarily used in the authentication process). The S-CSCF server 22 determines and transmits an authentication challenge to the non-registering endpoint 16 (step 78). The challenge may be sent directly to the non-registering endpoint 16 (if a communication path between the server and endpoint exists), or via other entities in the network (e.g. to the I-CSCF 20 and the P-CSCF 18). The non-registering endpoint 16 calculates a response to the authentication challenge and sends the response back to the S-CSCF server 22. Specifically, the response is sent from the non-registering endpoint 16 to the P-CSCF 18 (step 80). As before, the P-CSCF server forwards the response to the I-CSCF server 20 (step 82), and the I-CSCF server 20 queries the HSS 24 to find a suitable S-CSCF server to process the request (step 84). This time, as an association exists between the non-registering endpoint 16 and S-CSCF server 22, and is stored in the HSS 24, the HSS 24 responds to the query by specifying the associated S-CSCF server 22 (step 86). In response, the I-CSCF 20 forwards the request and the challenge response to the associated S-CSCF server 22 (step 88).

The associated S-CSCF server 22 receives the response to the authentication challenge from the non-registering endpoint and determines if the received response matches an expected response (step 90). If the received response does not match the expected response, the non-registering endpoint has failed the authentication challenge and the S-CSCF server 22 stops processing the received request. The S-CSCF server 22 may send a message to the non-registering endpoint to indicate that the request has failed. If the received response does match the expected response, the S-CSCF server 22 authenticates the non-registering endpoint 16. The server is then able to process the received request and route the received non-registration request in the IMS network to provide the authenticated non-registering endpoint with the requested IMS service (step 92).

The S-CSCF may send a Server-Assignment-Request (SAR) to the HSS 24 to be permanently associated with the non-registering IP PBX 16. The response to the SAR from the HSS 24 comprises initial filter criteria (iFCs) of the non-registering IP PBX 16, which specify how a request from the IP PBX 16 is to be processed.

In embodiments, the P-CSCF 18 is configured to route requests from the non-registering endpoint 16 to the S-CSCF 22 directly. In this embodiment therefore, steps 62 to 70 are replaced by a single step (not shown in FIG. 3) in which the P-CSCF 18 routes the request directly to the S-CSCF 22. (Similarly, steps 82 to 88 may be replaced by a single step—not shown—in which the P-CSCF 18 routes the response to the authentication challenge directly to the S-CSCF 22). This may occur if there is a single S-CSCF 22 in the network which can process such requests, or if there is particular S-CSCF 22 which is configured to challenge requests from the P-CSCF 18. Here, the P-CSCF 18 is configured to add challenge data to the request for the service from the non-registering endpoint, the challenge data specifying that the request is to be challenged by the S-CSCF server, and to transmit the request for the service and the challenge data to the S-CSCF server. In embodiments, the challenge data added to the request for the service comprises adding a SIP parameter or header to the request, which indicates to the S-CSCF server that receives the request that it must challenge the IP PBX 16.

The S-CSCF server 22 is typically configured to handle user equipment (UE) which is registered, as well as registered PBXs, and non-registering PBXs. The S-CSCF server 22 may be configured to enable it to challenge non-registration requests received from a non-registering PBX 16, but not challenge requests from registered UEs. In embodiments, the S-CSCF 22 presents itself as two logical S-CSCFs with different SIP uniform resource identifiers (URIs). One of these virtual S-CSCFs is configured to challenge requests from non-registering PBXs, while the other virtual S-CSCF is configured not to challenge requests from registered endpoints. In embodiments, the P-CSCF server 18 is configured to route requests from the non-registering endpoint 16 to one of the virtual S-CSCFs which is configured to challenge requests. The P-CSCF 18 is configured to add address data to the request for the service from the non-registering endpoint, the address data specifying that the request is to be processed by the virtual S-CSCF server that is capable of challenging requests, and transmitting the request for the service and the address data to the virtual S-CSCF server.

In embodiments, as mentioned earlier, the S-CSCF 22 may comprise or be coupled to a data store that caches the credentials and the iFCs received from the HSS 24. In this case, the S-CSCF 22 does not need to contact the HSS 24 again and can instead process a request from the non-registering IP PBX 16 using the data it has cached. Accordingly, when a subsequent request from the associated non-registering IP PBX 16 is received at the S-CSCF 22, the S-CSCF 22 does not need to perform steps 72 to 76, or the SAR process mentioned above. If the credentials and/or the iFCs for the non-registering IP PBX 16 change, the HSS 24 would automatically notify the associated S-CSCF 22, using for example, a push-profile-request or a registration-termination-request from the Cx interface of the HSS. The S-CSCF 22 may be configured to replace the cached credentials and/or iFCs with the updated versions.

In embodiments, the non-registering IP PBX 16 is able to pre-compute a challenge response based on a previous challenge it has received from the associated S-CSCF 22. The IP PBX 16 may, for example, increment the nonce count that is part of SIP digest authentication. The pre-computer challenge response could be provided to the S-CSCF server 22 with the request for an IMS service. In this case, steps 78 to 88 could be avoided, and the S-CSCF server 22 would authenticate the IP PBX 16 based on the pre-computer challenge response provided with the request.

The method outlined in FIG. 3 is secure since the S-CSCF 22 must be able to authenticate non-registration requests from unregistered subscribers (i.e. non-registering endpoints). This is achieved either by configuring the P-CSCF 18 with the details of the specific S-CSCF to use to process requests from the non-registering endpoints (e.g. the S-CSCF associated with the non-registering endpoint), or by letting the I-CSCF select an S-CSCF based on the IMPU of the non-registering endpoint (which is added by the P-CSCF to the request) and the capabilities stored in the HSS for this IMPU. Crucially, all this information is controlled by the service provider, so there is no way for a malicious device to arrange for an S-CSCF to be selected that would not challenge its request for an IMS service.

FIG. 4 shows a schematic diagram of the steps to provide a non-registering endpoint with services in an IMS network using an Application Server. As in FIG. 3, a non-registering IP PBX 16 transmits a non-registration request (step 60) to the IMS network. In this example process flow, the request is initially received by a proxy server, P-CSCF 18. The P-CSCF 18 is configured to determine if the request has been received from a known entity. The P-CSCF 18 determines if it has configuration data associated with the non-registering endpoint 16, the configuration data comprising a public identity (IMPU) of the non-registering endpoint 16. Even if the P-CSCF 18 knows what the public identify of the non-registering endpoint 16 is, the P-CSCF 18 does not automatically trust the non-registering endpoint 16. Instead, the P-CSCF 18 now knows that the request can be allowed into the core network, but must be challenged. On the other hand, if the P-CSCF 18 does not have configuration data comprising a public identity of the non-registering endpoint 16, the P-CSCF 18 knows to not trust the endpoint 16 and rejects the received request. If the public identity IMPU is known to the P-CSCF 18, the public identity is added to the non-registration request before forwarding the request (step 62). This may be added to the request in the P-Asserted-Identity (PAI) portion/header of the SIP request.

The P-CSCF 18 then forwards the modified request to an S-CSCF 22 (step 94). The P-CSCF 18 may forward the request directly to the S-CSCF 22 as shown, or may follow a similar procedure to that shown in steps 64 to 68 of FIG. 3. Once the request has been received by the S-CSCF server 22, the S-CSCF server 22 sends a Server-Assignment-Request (SAR) to the HSS 24 to obtain subscription data for the non-registering endpoint 16 (step 96). The subscription data specifies a subscription of the non-registering endpoint to an Application Server (AS) 34, and specifies (via, for example, the initial Filter Criteria (iFCs) of the non-registering endpoint 16), a static association of the Application Server 34 with the non-registering endpoint 16. The HSS 24 returns the requested subscription data (step 98) which specifies a particular Application Server 34 to be used to process the request. The S-CSCF server 22 forwards the received request for a service to the associated Application Server 34 (step 100). The S-CSCF server 22 is configured to cache the received subscription data so that it can process requests received from the non-registering endpoint 16 in the future more efficiently, by automatically forwarding the requests to the associated Application Server 34.

The Application Server 34 requests a set of credentials for the non-registering endpoint 16 to determine if the non-registering endpoint is permitted to access IMS services. Application Servers 34 do not normally have access to an endpoint's credentials when processing a SIP request. To get access to them, the Application Server 34 sends the request to the Zh interface of the HSS, which is normally used when authenticating a web-based request received directly from a UE (e.g. a web-based request from a user of a UE to modify their call service settings, voicemail settings, call forwarding settings, etc.). The Application Server 34 sends a Multimedia Authentication Request (MAR) to the Zh interface of the HSS (step 72). As explained earlier, the Application Server 34 does not usually have access to an endpoint's authentication credentials when it is processing a SIP request from the endpoint. To obtain the credentials, the Application Server 34 uses the Zh interface of the HSS to make a web-based request for the credentials. By making it seem like, to the HSS 24, that the non-registering endpoint 16 is making a web-request, the Application Server 34 is permitted to send a Zh MAR request to the HSS 24, and the HSS 24 is in turn, permitted to supply the requested credentials.

In this embodiment, since the Application Server 34 is pre-associated with the non-registering endpoint 16 (as specified in the iFCs of the endpoint 16), the HSS 24 does not perform an associating step (i.e. step 74 in FIG. 3). However, the static association of the Application Server 34 has the same advantage: if a subsequent request for a service is received from the non-registering endpoint, the HSS 24 or the S-CSCF 22 will be able to automatically specify that the Application Server 34 is to process the subsequent request. This may make the processing of subsequent requests more efficient and faster.

The HSS 24 supplies the requested credentials to the Application Server (step 76). The Application Server 34 is configured to authenticate the non-registering endpoint 16. This may occur after the credentials are received from the HSS, or at substantially the same time (as the credentials are not necessarily used in the authentication process). The Application Server 34 determines and transmits an authentication challenge to the non-registering endpoint 16 (step 78). The challenge may be sent directly to the non-registering endpoint 16 (if a communication path between the server and endpoint exists), or via other entities in the network (e.g. to the I-CSCF 20 and the P-CSCF 18). The non-registering endpoint 16 calculates a response to the authentication challenge and sends the response back to the Application Server 34. Specifically, the response is sent from the non-registering endpoint 16 to the P-CSCF 18 (step 80). As before, the P-CSCF server forwards the response to the S-CSCF server 22 (step 102). The S-CSCF server 22 uses the cached subscription data to determine that the request and response is to be forwarded to the associated Application Server 34, and forwards the request and response accordingly (step 104).

The associated Application Server 34 receives the response to the authentication challenge from the non-registering endpoint and determines if the received response matches an expected response (step 90). If the received response does not match the expected response, the non-registering endpoint has failed the authentication challenge and the Application Server 34 stops processing the received request. If the received response does match the expected response, the Application Server 34 authenticates the non-registering endpoint 16. The server is then able to process the received request and route the received non-registration request in the IMS network to provide the authenticated non-registering endpoint with the requested IMS service (step 92).

The method outlined in FIG. 4 is secure since the public identity which the P-CSCF 18 adds to the request received from the non-registering endpoint 16, and the iFCs that are provided by the HSS in response to the public identity, are both controlled by the service provider. Therefore, there is no way for a malicious third party to steal service from the network through the IP PBX 16 because there is no way to avoid the authentication performed by the Application Server 34.

In embodiments, as mentioned earlier, the Application Server 34 may comprise or be coupled to a data store that caches the credentials and iFCs received from the HSS 24. In this case, the Application Server 34 does not need to contact the HSS 24 again and can instead process a request from the non-registering IP PBX 16 using the data it has cached. Accordingly, when a subsequent request from the associated non-registering IP PBX 16 is received at the Application Server 34, the Application Server 34 does not need to perform steps 72 and 76.

The HSS 24 is not configured to automatically send updated credentials and/or the iFCs to the Application Server 34. The Application Server 34 may be configured to cache the credentials and iFCs, but there is a risk that the Application Server 34 uses out-of-date credentials. Thus, in embodiments the Application Server 34 is configured to request updated credentials from the Zh interface of the HSS for the non-registering endpoint, and caching the updated credentials. The Application Server 34 may be configured to make this request when a new non-registration request is received from the non-registering endpoint.

In embodiments, the non-registering IP PBX 16 is able to pre-compute a challenge response based on a previous challenge it has received from the associated Application Server 34. The IP PBX 16 may, for example, increment the nonce count that is part of SIP digest authentication. The pre-computed challenge response could be provided to the Application Server 34 with the request for an IMS service. In this case, steps 78 to 104 could be avoided, and the Application Server 34 would authenticate the IP PBX 16 based on the pre-computed challenge response provided with the request.

Those skilled in the art will appreciate that while the foregoing has described what is considered to be the best mode and where appropriate other modes of performing present techniques, the present techniques should not be limited to the specific configurations and methods disclosed in this description of the preferred embodiment. Those skilled in the art will recognise that present techniques have a broad range of applications, and that the embodiments may take a wide range of modifications without departing from the any inventive concept as defined in the appended claims.

The invention claimed is:

1. A method for providing a non-registering endpoint with services in an Internet Protocol (IP) Multimedia Subsystem (IMS) network, the method comprising acts of:
    receiving, at at least one Call Session Control Function (CSCF) server in the IMS network configured to process requests, a non-registration request for an IMS service from the non-registering endpoint, wherein the non-registration request is received via a proxy server configured to receive requests from endpoints in the IMS network;
    requesting, by the at least one CSCF server, of a Home Subscriber Server (HSS) a set of credentials for the non-registering endpoint;
    receiving, at the at least one CSCF server, the set of credentials from the HSS;
    transmitting, using the at least one CSCF server, an authentication challenge to the non-registering endpoint;
    receiving, at the at least one CSCF server, a response to the authentication challenge from the non-registering endpoint;
    determining if the received response matches an expected response;
    authenticating, responsive to the determining, the non-registering endpoint if the received response matches the expected response; and
    routing, using the at least one CSCF server, the received non-registration request in the IMS network to provide the authenticated non-registering endpoint with the requested IMS service,
    wherein the act of receiving the request for a service at the at least one CSCF server, from the proxy server, comprises:
        determining, at the proxy server, whether the proxy server has configuration data associated with the non-registering endpoint, the configuration data comprising a public identity of the non-registering endpoint;
        forwarding, responsive to the determining, the request for the IMS service and the public identity to the HSS to determine a server to be used to process the request; and
        transmitting the request to the server to be used to process the request, wherein the act of requesting of the set of credentials comprises simulating, using a S-CSCF server, registration of the non-registering endpoint to enable the HSS to provide the set of credentials to the S-CSCF server, and further comprises:
  associating, at the HSS, the S-CSCF server with the non-registering endpoint; and
  providing the S-CSCF server with information needed to process all subsequent requests received from the associated non-registering endpoint,
wherein the simulating comprises sending a Multimedia-Auth-Request (MAR) to a Cx interface of the HSS, and wherein associating the S-CSCF server with the authenticated non-registering endpoint comprises storing data in the HSS to associate the S-CSCF server which sent the MAR with the non-registering endpoint.

2. The method as claimed in claim 1 wherein the requesting of the set of credentials is performed in parallel with the transmitting of the authentication challenge to the non-registering endpoint.

3. The method as claimed in claim 1 wherein the transmitting of the authentication challenge comprises transmitting a 407 Proxy Authentication challenge to the non-registering endpoint.

4. The method as claimed in claim 1 wherein the act of transmitting the request to the server to be used to process the request comprises forwarding the request to a Serving-Call Session Control Function (S-CSCF) server for processing the request.

5. The method as claimed in claim 4 further comprising:
  adding challenge data, using the proxy server, to the request for the service from the non-registering endpoint, the challenge data specifying that the request is to be challenged by the S-CSCF server; and
  transmitting, using the proxy server, the request for the service and the challenge data to the S-CSCF server.

6. A method for providing a non-registering endpoint with services in an Internet Protocol (IP) Multimedia Subsystem (IMS) network, the method comprising acts of:
  receiving, at at least one Call Session Control Function (CSCF) server in the IMS network configured to process requests, a non-registration request for an IMS service from the non-registering endpoint, wherein the non-registration request is received via a proxy server configured to receive requests from endpoints in the IMS network;
  requesting, by the at least one CSCF server, of a Home Subscriber Server (HSS) a set of credentials for the non-registering endpoint;
  receiving, at the at least one CSCF server, the set of credentials from the HSS;
  transmitting, using the at least one CSCF server, an authentication challenge to the non-registering endpoint;
  receiving, at the at least one CSCF server, a response to the authentication challenge from the non-registering endpoint;
  determining if the received response matches an expected response;
  authenticating, responsive to the determining, the non-registering endpoint if the received response matches the expected response; and
  routing, using the at least one CSCF server, the received non-registration request in the IMS network to provide the authenticated non-registering endpoint with the requested IMS service,
wherein the act of receiving the request for a service at the at least one CSCF server, from the proxy server, comprises:
  determining, at the proxy server, whether the proxy server has configuration data associated with the non-registering endpoint, the configuration data comprising a public identity of the non-registering endpoint;
  forwarding, responsive to the determining, the request for the IMS service and the public identity to the HSS to determine a server to be used to process the request; and
  transmitting the request to the server to be used to process the request, and
wherein the transmitting of the request to the server comprises transmitting the request to a virtual S-CSCF server configured to process non-registration requests from non-registering endpoints; and
associating, at the HSS, the S-CSCF server with the non-registering endpoint, and providing the S-CSCF server with information needed to process all subsequent requests received from the associated non-registering endpoint, wherein the associating of the S-CSCF server with the non-registering endpoint comprises associating the virtual S-CSCF server with the non-registering endpoint.

7. The method as claimed in claim 6 further comprising:
  adding address data, using the proxy server, to the request for the service from the non-registering endpoint, the address data specifying that the request is to be processed by the virtual S-CSCF server; and
  transmitting, using the proxy server, the request for the service and the address data to the virtual S-CSCF server.

8. A method for providing a non-registering endpoint with services in an Internet Protocol (IP) Multimedia Subsystem (IMS) network, the method comprising acts of:
  receiving, at at least one Call Session Control Function (CSCF) server in the IMS network configured to process requests, a non-registration request for an IMS service from the non-registering endpoint, wherein the non-registration request is received via a proxy server configured to receive requests from endpoints in the IMS network;
  requesting, by the at least one CSCF server, of a Home Subscriber Server (HSS) a set of credentials for the non-registering endpoint;
  receiving, at the at least one CSCF server, the set of credentials from the HSS;
  transmitting, using the at least one CSCF server, an authentication challenge to the non-registering endpoint;
  receiving, at the at least one CSCF server, a response to the authentication challenge from the non-registering endpoint;
  determining if the received response matches an expected response;
  authenticating, responsive to the determining, the non-registering endpoint if the received response matches the expected response; and
  routing, using the at least one CSCF server, the received non-registration request in the IMS network to provide the authenticated non-registering endpoint with the requested IMS service, wherein the act of receiving the request for a service at the at least one CSCF server, from the proxy server, comprises:

determining, at the proxy server, whether the proxy server has configuration data associated with the non-registering endpoint, the configuration data comprising a public identity of the non-registering endpoint;

forwarding, responsive to the determining, the request for the IMS service and the public identity to the HSS to determine a server to be used to process the request; and transmitting the request to the server to be used to process the request, wherein the server comprises a Serving-Call Session Control Function (S-CSCF) server for processing the request and the method further comprises:

caching, at the at least one CSCF server, the received set of credentials; and automatically receiving, at the S-CSCF server, updated credentials from the Cx interface of the HSS for the non-registering endpoint, and caching the updated credentials.

9. A method for providing a non-registering endpoint with services in an Internet Protocol (IP) Multimedia Subsystem (IMS) network, the method comprising acts of:

receiving, at at least one Call Session Control Function (CSCF) server in the IMS network configured to process requests, a non-registration request for an IMS service from the non-registering endpoint, wherein the request for a service is received via a proxy server configured to receive requests from endpoints in the IMS network;

requesting, by the at least one CSCF server, of a Home Subscriber Server (HSS) a set of credentials for the non-registering endpoint;

receiving, at the at least one CSCF server, the set of credentials from the HSS;

transmitting, using the at least one CSCF server, an authentication challenge to the non-registering endpoint;

receiving, at the at least one CSCF server, a response to the authentication challenge from the non-registering endpoint;

determining if the received response matches an expected response;

authenticating, responsive to the determining, the non-registering endpoint if the received response matches the expected response; and routing, using the at least one CSCF server, the received non-registration request in the IMS network to provide the authenticated non-registering endpoint with the requested IMS service, wherein the act of receiving the request for a service at the at least one CSCF server, from the proxy server, comprises:

determining, at the proxy server, whether the proxy server has configuration data associated with the non-registering endpoint, the configuration data comprising a public identity of the non-registering endpoint;

forwarding, responsive to the determining, the request for the IMS service and the public identity to a Serving-Call Session Control Function (S-CSCF) server;

transmitting a Server Assignment Request (SAR), by the S-CSCF server to the HSS, to obtain subscription data specifying:

a subscription of the non-registering endpoint to an Application Server (AS), and a static association of the Application Server with the non-registering endpoint; and receiving the subscription data and, responsive to the receiving, forwarding the received request for a service to the associated Application Server.

10. The method as claimed in claim 9 wherein the requesting of the set of credentials comprises sending, by the Application Server, a Multimedia-Auth-Request (MAR) to a Zh interface of the HSS.

11. The method as claimed in claim 9 further comprising:

caching, at the Application Server, the received set of credentials;

requesting, at the Application Server, updated credentials from the Zh interface of the HSS for the non-registering endpoint, and caching the updated credentials; and requesting updated credentials comprises querying the HSS when a new request for an IMS service is received from the non-registering endpoint.

12. The method as claimed in claim 9 wherein the requesting of the set of credentials comprises simulating, using the Application Server, access of an endpoint to a web-based service, to enable the HSS to provide the set of credentials of the non-registering endpoint.

* * * * *